United States Patent [19]

Abert et al.

[11] Patent Number: 5,692,133
[45] Date of Patent: Nov. 25, 1997

[54] ARRANGEMENT HAVING SEVERAL FUNCTIONAL UNITS

[75] Inventors: Michael Abert, Au; Siegfried Block, Kandel; Johannes Bozenhardt; Franz Leigsnering, both of Ettlingen; Werner Pfatteicher, Pfinztal; Franz-Clemens Schewe, Karlsruhe, all of Germany

[73] Assignee: Siemens Aktiengesellschaft, München, Germany

[21] Appl. No.: 454,165

[22] PCT Filed: Dec. 10, 1993

[86] PCT No.: PCT/DE93/01185

§ 371 Date: Jul. 20, 1995

§ 102(e) Date: Jul. 20, 1995

[87] PCT Pub. No.: WO94/14120

PCT Pub. Date: Jun. 23, 1994

[30] Foreign Application Priority Data

Dec. 14, 1992 [DE] Germany ............ 42 42 133.0

[51] Int. Cl.[6] .................................................. G06F 13/00
[52] U.S. Cl. ................................... 395/282; 395/299
[58] Field of Search ................................. 395/282, 295, 395/302, 63, 730, 299

[56] References Cited

U.S. PATENT DOCUMENTS

| | | | |
|---|---|---|---|
| 3,832,692 | 8/1974 | Henze et al. | 395/302 |
| 4,442,504 | 4/1984 | Dummermuth et al. | 395/737 |
| 4,724,519 | 2/1988 | Barlow et al. | 395/302 |
| 4,779,195 | 10/1988 | James | 395/869 |
| 4,918,589 | 4/1990 | Floro et al. | 395/835 |
| 5,034,881 | 7/1991 | Hoashi et al. | 395/303 |
| 5,225,974 | 7/1993 | Mathews et al. | 395/821 |
| 5,274,767 | 12/1993 | Maskovyak | 395/836 |
| 5,430,848 | 7/1995 | Waggener | 395/303 |
| 5,459,840 | 10/1995 | Isfeld et al. | 395/309 |
| 5,475,583 | 12/1995 | Bock et al. | 364/141 |
| 5,524,211 | 6/1996 | Woods et al. | 395/200.1 |
| 5,541,810 | 7/1996 | Donhauser et al. | 361/686 |
| 5,564,025 | 10/1996 | De Freese et al. | 395/303 |

FOREIGN PATENT DOCUMENTS

| | | |
|---|---|---|
| 0 374 521 | 6/1990 | European Pat. Off. . |
| 42 39 030 | 5/1994 | Germany . |

OTHER PUBLICATIONS

IBM Technical Disclosure Bulletin, vol. 33, No. 12, May 1991, New York, US, pp. 451-453: *Bus Arbiter with Synchronised Reset*.

IBM Technical Disclosure Bulletin, vol. 27, No. 5, Oct. 1984, New York, US, pp. 3150-3152: *Multiplexing of Interrupt and DMA Request Lines*.

IBM Technical Disclosure Bulletin, vol. 32, No. 4A, Sep. 1989, New York, US, pp. 32-33: *Switched Bus for High-Performance Multi-Processor Systems*.

Siemens-Catalog "Simatic S5", st 54.1, 1992.

Bussysteme—Parallele und Serielle Bussysteme in Theorie und Praxis, pp. 43-58, B. Wiemann, 1984.

PC-Hardwarebuch, Hans-Peter Messmer, 2nd Ed., Addison-Wesley, 1993, Bonn, DE, pp. 284-312, 638-657.

*Primary Examiner*—Ayaz R. Sheikh
*Attorney, Agent, or Firm*—Kenyon & Kenyon

[57] ABSTRACT

The invention relates to an arrangement for running a system bus in a device such as a programmable controller. The arrangement includes a number of card slots interconnected via a system bus with data and control lines, and via address lines. A number of functional units may be plugged into the card slots. One or more of the functional units may be adapted for read and/or write access (e.g., a CPU component), and each functional unit so-configured includes an arbiter capable of managing the system bus. At system startup, one of the arbiters is activated to manage the system bus while the other arbiters remain passive. The functional units may advantageously be plugged into any of the card slots; that is, there is no need to have a particular card slot dedicated to running the system bus.

8 Claims, 1 Drawing Sheet

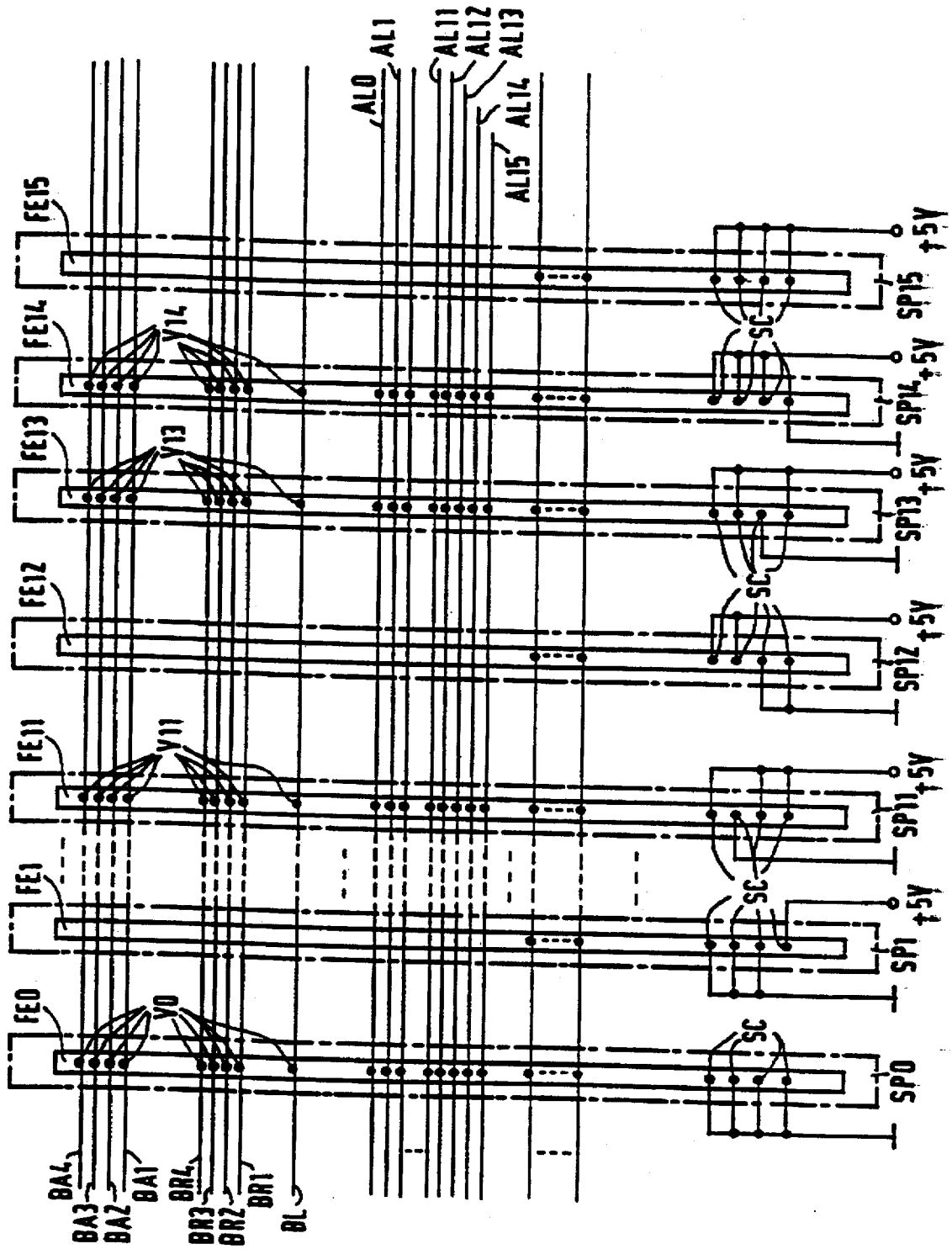

SP15

ARRANGEMENT HAVING SEVERAL FUNCTIONAL UNITS

BACKGROUND OF THE INVENTION

The invention relates to an arrangement having several card slots into which a number of functional units can be plugged, with the card slots interconnected by a system bus having data and control lines and by address lines.

The present invention may be advantageously applied, for example, in a programmable controller consisting of central controllers and expansion units. Such a device is disclosed in Siemens catalog "SIMATIC S5, ST 54.1" (1992). The programmable controller has a number of card slots for receiving components, such as central processing units (CPUs) which execute control programs, and digital or analog input/output components for inputting and outputting digital or analog signals. Several CPUs are customarily used in devices of this type to handle complex control tasks, thus requiring a so-called "coordinator" or "arbiter" to regulate the manner in which the CPUs access a system bus connecting the various components. In the disclosed device, however, the coordinator must be plugged into a particular card slot provided especially for that purpose.

In programmable controllers of the type just discussed, it is known to have a central bus node manage bus accesses by a plurality of other bus nodes. For example, B. Wiemann, *Bus Systems—Parallel and Serial Bus Systems in Theory and Practice*, 43–58 (1984) discloses that within a bus system, a central bus node may be connected to another bus node by two lines. The central bus node functions as an arbiter, receiving bus requests from the other bus node over one connecting line and informing the other bus node of a bus grant decision over the other connecting line. The central bus node may coordinate bus accesses by a plurality of bus nodes in this manner.

The requirement of a dedicated card slot for these known approaches to bus access management is undesirable in that it limits flexibility in system configuration. Accordingly, an object of the present invention is to provide an arrangement for a device, such as a programmable controller, in which a central bus node responsible for running a bus can be plugged into any card slot.

SUMMARY OF THE INVENTION

An arrangement for managing bus access in a device, such as a programmable controller, according to the present invention includes several card slots interconnected by both a system bus having data and control lines, and by address lines. Bus request lines, bus grant lines and bus lock lines are run to connectors of the card slots. The arrangement further includes a means for generating a card slot code for each card slot.

This arrangement further includes a number of plug-in functional units, of which at least two are suited to executing read and/or write accesses to other units over the system bus. In each case, these plug-in functional units include a means for connecting the bus request, bus grant and bus lock lines to the functional units; an arbiter for running the system bus; a means for determining the card slot code of the card slots into which functional units suited to executing read and/or write accesses are plugged; a means for generating a position code from these card slot codes; and a means for activating the arbiter in case the position code corresponds to a specific selection code.

Advantageously, no special component is required to run the system bus since each functional unit capable of executing read and/or write accesses (e.g., a CPU component) is provided with its own arbiter. Only one of the arbiters will be active during system operation, while the rest remain passive. The arbiter to be activated is determined during start-up of the device; for example, during an initialization phase after a supply voltage is switched on.

The arrangement according to the invention is particularly well-suited for application in a programmable controller; and preferably in a programmable controller having a central controller and at least one expansion unit which are interconnected via a connecting cable containing the system bus and address lines. Features and advantages of the present invention are described below with reference to the drawing figure and a preferred embodiment. Other features and advantages will be evident to persons skilled in the art.

BRIEF DESCRIPTION OF THE DRAWINGS

FIG. 1 shows a block diagram of an embodiment of the arrangement according to the present invention.

DETAILED DESCRIPTION

Referring now to FIG. 1, an embodiment of the present invention includes a plurality of card slots SP0 . . . SP15 interconnected via a system bus SYB having several data and control lines, and via a plurality of address lines AL0 . . . AL15. A plurality of functional units FE0 . . . FE15 are plugged into the card slots SP0 . . . SP15 using a suitable connecting means, such as spring or blade contacts, as is well known in the art. In the particular embodiment shown in FIG. 1, only four of the functional units FE0 . . . FE15 are adapted for executing read and/or write accesses to other units. Accordingly, four bus request lines BA1 . . . BA4, four bus grant lines BR1 . . . BR4 and a bus lock line BL suffice to run the system bus SYB. These lines are run to the respective connecting means of the card slots SP0 . . . SP15.

The functional units FE0 . . . FE15 can be plugged into any of the card slots SP0 . . . SP15. The particular functional units adapted for executing read and/or write accesses have for this purpose suitable connecting means for making contact with the bus request, bus grant and bus lock lines. In the embodiment of FIG. 1, appropriate connections V0, V11, V13 and V14 respectively couple the functional units FE0, FE11, FE13 and FE14 to the card slots SP0, SP11, SP13 and SP14, and thus to the bus lock line BL, the bus request lines BR1 . . . BR4 and the bus grant lines BA1 . . . BA4.

The card slots SP0 . . . SP15 are each assigned a card slot code using terminals SC of the card slots SP0 . . . SP15 connected to a ground connection and a 5 Volt supply voltage source. For example, card slot SP0 may be assigned the code 0000, card slot SP1 may be assigned the code 0001, and so on, with the card slot codes stored in corresponding card slot code registers of the functional units FE0 . . . FE15.

The functional units FE0, FE11, FE13 and FE14 each include an arbiter (not shown) to run the system bus SYB. During operation, the arbiter processes bus requests from the various functional units according to a known selection technique (e.g., priority-driven selection or sequence-driven selection) and determines the unit to be granted the bus. The particular selection technique applied is not critical to the present invention, and thus is not described in detail.

The arbiters in the functional units FE0, FE11, FE13 and FE14 are initially passive. At system start-up (e.g. during an initialization phase after a supply voltage is switched on), one of the arbiters is activated to run the system bus SYB, while the remaining three arbiters remain passive. This selection process may be carried out by a start-up program executed by the four functional units FE0, FE11, FE13 and FE14. For example, the start-up program could be configured to activate the arbiter of the second functional unit starting from the card slot SP0, as indicated by a corresponding selection code in the program. In this example, the arbiter of functional unit FE11 would be designated to run the bus. Specification of the arbiter to be activated is most practically done during the start-up of the arrangement, with the selection code stored in a corresponding program. Alternatively, a so-called set-up program may be provided which automatically starts up each time the system is started and prompts the user to input an appropriate selection code.

As disclosed in German patent application P 42 39 030.3, the address lines AL0 ... AL15 are run from card slot to card slot through appropriate connecting means. The functional units FE0, FE11, FE13, FE14 adapted for executing read and/or write accesses are also provided with means for making contact with the card slot connecting means, and thus with the address lines AL0 ... AL15. The remaining functional units FE1, FE12 and FE15 are each connected to a selection terminal (not shown) of the card slots SP1, SP12 and SP15, respectively, with the selection terminal of the card slot SP1 being connected to the address line AL1. Similarly, selection terminals of the card slots SP12 and SP15 are connected to the address lines AL12 and AL15. The functional units FE0, FE11, FE13 and FE14 are able to address the functional units FE1, FE12 and FE15 via these selection terminals.

The functional units FE0, FE11, FE13 and FE14 each execute program instructions to read their respective card slot codes from the card slot code register. The codes are then used to activate the respective address lines assigned to the particular functional units. In addition, the functional units check which other address lines are activated. In the particular embodiment shown in FIG. 1, the address lines AL0, AL11, AL13 and AL14 are activated, indicating that four units are plugged in which are capable of executing read and/or write accesses on other units.

Each of the functional units FE0, FE11, FE13 or FE14 also uses the card slot codes to determine its own position code within the arrangement. For example, the functional unit FE0 computes a position code of 1 from its card slot code of 0 and the remaining card slot codes of 11, 13 and 14; the functional unit FE11 computes a position code of 2 from its card slot code of 11 and the remaining card slot codes of 0, 13 and 14; and analogously, the other functional units FE13, FE14 compute position codes 3 and 4. This means that, according to the specified selection code, the arbiter of the functional unit FE11 becomes active, whereas the arbiter of each of the remaining functional units FE0, FE13 and FE14 remains passive. If the functional unit FE0 was not plugged into the card slot SP0, then according to the foregoing selection method and method of operation, the arbiter of the functional unit FE13 would run the bus.

While the present invention has been described with reference to specific embodiments, persons skilled in the art will recognize that many modifications and variations are possible. Accordingly, the present invention embraces all alternatives, modifications and variations that fall within the spirit and scope of the appended claims, as well as all equivalents thereof.

We claim:

1. An arrangement for a programmable controller comprising:

(a) a system bus having data and control lines, said data and control lines comprising a bus request line, a bus grant line and a bus lock line;

(b) a plurality of address lines;

(c) a plurality of card slots interconnected by said system bus and by said address lines;

(d) a code generator for generating a card slot code for each of said plurality of card slots; and (e) a plurality of functional units adapted to be plugged into said card slots, wherein each of said plurality of functional units includes:

(i) means for determining a card slot code corresponding to a card slot into which a read/write functional unit is plugged, and (ii) an arbiter for managing said system bus, with said arbiter capable of being activated according to a selection code;

with at least two of said functional units comprising read/write functional units, wherein each of said read/write functional units includes:

(i) a connector for coupling said read/write functional unit to said bus request line, said bus grant line and said bus lock line, (ii) means for determining a position code corresponding to a relative position of said read/write functional unit within the arrangement using said card slot codes associated with said plurality of functional units, and (iii) means for activating said arbiter when said position code corresponds to said selection code, said arbiter active during operation of the arrangement.

2. The arrangement of claim 1 wherein each of said functional units, dependent upon its card slot code, activates an address line assigned to it and monitors said address line to determine a card slot code into which a read/write functional unit is plugged.

3. The arrangement of claim 1, wherein the arbiter having the position code corresponding to the selection code remains active throughout the operation of the arrangement, and wherein each of the remaining arbiters remains in a passive state throughout the operation of the arrangement.

4. A programmable controller comprising an arrangement including:

(a) a system bus having data and control lines, said data and control lines comprising a bus request line, a bus grant line and a bus lock line;

(b) a plurality of address lines;

(c) a plurality of card slots interconnected by said system bus and by said address lines;

(d) a code generator for generating a card slot code for each of said plurality of card slots; and (e) a plurality of functional units adapted to be plugged into said card slots, wherein each of said plurality of functional units includes:

(i) means for determining a card slot code corresponding to a card slot into which a read/write functional unit is plugged, and (ii) an arbiter for managing said system bus, with said arbiter capable of being activated according to a selection code;

with at least two of said functional units comprising read/write functional units, wherein each of said read/write functional units includes:

(i) a connector for coupling said read/write functional unit to said bus request line, said bus grant line and said bus lock line, (ii) means for determining a position code corresponding to a relative position of said read/write functional unit within the arrangement using said card slot codes associated with said plurality of functional units, and (iii) means for activating said arbiter when said position code corresponds to said selection code, said arbiter active during operation of the arrangement.

5. The programmable controller of claim 4 further comprising a central controller including said arrangement and an expansion unit coupled to said central controller by a connecting cable containing said system bus and said address lines.

6. The programmable controller of claim 4, wherein the arbiter having the position code corresponding to the selection code remains active throughout the operation of the arrangement, and wherein each of the remaining arbiters remains in a passive state throughout the operation of the arrangement.

7. A plug-in functional unit capable of executing a read/write operation, said plug-in functional unit comprising:

(a) means for determining a card slot code corresponding to each of a plurality of card slots of an arrangement into which functional units capable of executing a read/write operation are plugged, wherein said card slots are interconnected by a system bus having data and control lines, and by a plurality of address lines;

(b) an arbiter for managing said system bus, said arbiter capable of being activated based on a selection code;

(c) means for connecting said plug-in functional unit to a bus request line, a bus grant line and a bus lock line of said arrangement;

(d) means for determining a position code corresponding to a relative position of said plug-in functional unit within said arrangement using said card slot codes; and (e) means for activating said arbiter when said position code corresponds to said selection code, wherein said arbiter remains active during operation of said arrangement.

8. The plug-in functional unit of claim 7 wherein said functional unit, dependent upon its card slot code, activates an address line assigned to it and monitors said address line to determine a card slot code into which another read/write functional unit is plugged.

* * * * *